United States Patent [19]

Jueliger

[11] Patent Number: 5,977,777

[45] Date of Patent: Nov. 2, 1999

[54] DEVICE IN A MOTOR VEHICLE FOR TRANSMITTING SIGNALS GENERATED BY MEANS OF A SENSOR

[75] Inventor: Peter Jueliger, Rülzheim, Germany

[73] Assignee: Robert Bosch GmbH, Stuttgart, Germany

[21] Appl. No.: 08/952,951

[22] PCT Filed: Feb. 27, 1997

[86] PCT No.: PCT/DE97/00346

§ 371 Date: Mar. 23, 1998

§ 102(e) Date: Mar. 23, 1998

[87] PCT Pub. No.: WO97/36379

PCT Pub. Date: Oct. 2, 1997

[30] Foreign Application Priority Data

Mar. 23, 1996 [DE] Germany .......................... 196 11 503

[51] Int. Cl.$^6$ .................................................. G01R 1/30
[52] U.S. Cl. .......................... 324/611; 324/713; 324/705; 340/870.38; 340/904
[58] Field of Search ................................ 324/715, 713, 324/703, 705, 611; 340/870.38, 904

[56] References Cited

U.S. PATENT DOCUMENTS

| Re. 30,603 | 5/1981 | Grindheim | 340/870.38 |
|---|---|---|---|
| 2,252,464 | 8/1941 | Kearns | 340/870.38 |
| 3,796,993 | 3/1974 | Fox | 340/870.38 |
| 4,071,823 | 1/1978 | Okayama | 340/870.38 |
| 4,803,420 | 2/1989 | Steinbrecher | 340/870.38 |

FOREIGN PATENT DOCUMENTS 3541 852 C2  6/1987  Germany .

OTHER PUBLICATIONS

Meyer H., Störfestigkeit von Meβsystemen, , Aug. 7, 1986.
Meyer–Brötz et al., Aufbau von Gleichspannungs–Differenzverstärkern mit hoher törspannungsunterdrückung, International Electronic Review, Series 18, 1965, Issue 11.
Laux, T., Störfaktoren im Visier., ELRAD 1994, Issue 3.

*Primary Examiner*—Josie Ballato
*Assistant Examiner*—Jose M. Solis
*Attorney, Agent, or Firm*—Kenyon & Kenyon

[57] ABSTRACT

A device in a motor vehicle, with which signals which are generated by a sensor and represent a physical magnitude are transmitted on signal lines. The device includes a voltage divider which is composed of the sensor and at least two impedances which are connected each at one end of the sensor. The signals generated by the sensor are guided, via signal lines connected at its terminals, to a differentiator, by which the usable signal is obtained, and interference signals coupled onto the signal lines are eliminated. Alternatively, the device can also be used for transmission on a signal line pair of any desired potential difference present at an impedance.

16 Claims, 5 Drawing Sheets

DEVICE IN A MOTOR VEHICLE FOR TRANSMITTING SIGNALS GENERATED BY MEANS OF A SENSOR

BACKGROUND OF THE INFORMATION

A large number of regulation and control systems are used today in automotive engineering. With many of these systems, it is necessary to sense various physical magnitudes by means of a sensor system, and convey them to the corresponding control device. An example that may be mentioned here is sensing of the oil temperature in the transmission, in the context of the transmission control system.

FIG. 5 shows a prior art circuit arrangement for a transmission control system in which the signal generated by the temperature sensor, which in this case represents the temperature of the oil in the transmission, is transmitted by means of two signal lines to the control device. To this end, there is mounted in the transmission (107) a sensor means (201) which is connected, via a first signal line (301a) and a second signal line (301b), to an input circuit (202') contained in a control device (306). Signal UTöl' generated by the sensor means is transmitted by means of the first signal line. The sensor means is connected to the ground A/D-GND of the control device via the second signal line. The input circuit consists of a component (RV1) which is used as a protective resistor, and of a filter which is made up of components RF1 and CF. The input circuit is connected via a first signal line (305a) and a second signal line (305b) to a microcontroller (204'). Signal UTöl* is transmitted to the microcontroller by means of the first signal line. The second signal line connects the microcontroller to ground A/D-GND.

Since the transmission and the control device are arranged physically apart from one another in the vehicle, the signal lines must be routed outside the control device. As a result, interference signals can in some circumstances be coupled onto the two signal lines.

An arrangement for blanking out interference signals on signal lines is described in German Patent No. 42 22 475. In a first exemplifying embodiment, an arrangement is presented that can be used in the transmission of analog signals. In this context, the original signal is transmitted on a first signal line, and the time derivative of the original signal is transmitted on a second signal line. At the receiving end, the derived signal transmitted on the second signal line is integrated by means of an integrator. An analog AND instruction is applied to this integration signal and to the original signal transmitted on the first signal line. The interference signals coupled onto the transmission link are thereby eliminated. In a second exemplifying embodiment, an arrangement is presented which can be used in the transmission of digital signals. To this end, the original signal is transmitted on a first signal line, and the inverted original signal is transmitted on a second signal line. At the receiving end, the two signals are each digitized by means of a digitizing stage. The coupled-in interference is thus also present in digitized form. The digitized signal of the inverted original signal transmitted on the second signal line is inverted again at the receiving end. A logical AND instruction is applied to this signal and to the digitized signal of the original signal transmitted on the first signal line. The interference signals coupled onto the transmission link are thereby eliminated.

The arrangements in the first and the second exemplifying embodiment have the disadvantage that they must use not only very precisely operating components, but also components that are very well tuned to one another. If this is not the case, a certain proportion of the interference signal may still be present in the usable signal.

U.S. Pat. No. 3,906,384 describes an arrangement with which interference signals, which are overlaid on the usable signal during processing thereof in processing components, are eliminated. In an exemplifying embodiment, an arrangement is presented in which the usable signal is fed on the one hand unchanged to first processing components, and on the other hand in inverted form to second processing components. With the prerequisite that the first and the second processing components are identical, the same interference is then superimposed on the signals present after processing by the processing components. The signals present after processing by the processing components are both fed to a subtracter. The interference caused by the processing components is thereby eliminated.

This arrangement has, however, the following disadvantages: On the one hand, implementation is complex because of the double processing components required. On the other hand, the processing components must be very well matched to one another, since the interference signals can be eliminated only if they are generated identically. In addition, the signal level of the usable signal is doubled by this arrangement.

It is the object of the present invention to improve the elimination of interference signals coupled onto the signal lines during the transmission of signals.

SUMMARY OF THE INVENTION

The present advantage of the invention as compared with the existing art cited initially is that the elimination of interference signals coupled onto the signal lines during the transmission of sensor signals is improved.

Further advantages of the present invention are evident from a comparison of the circuit arrangement according to the first exemplifying embodiment of the present invention (FIG. 3) with the arrangement described in German Patent No. 42 22 475 and with the arrangement described in U.S. Pat. No. 3,906,384. The comparison shows that in order to implement elimination of the interference signals, fewer components are required for the circuit arrangement according to the invention than for the arrangements belonging to the existing art.

A further advantage of the circuit arrangement according to the invention in the first exemplifying embodiment is evident from the voltage divider, which is made up of component RV1, sensor means 201, and component RV2. With the use of this voltage divider, signals phi1' and phi2', which must each be conveyed to an A/D converter for further processing with a microcontroller, are shifted toward those voltage or potential values which are advantageous for the processing being performed by the A/D converter. Since signals phi1' and phi2' are thus no longer located at the edge of the measurement range of the particular A/D converter, the conversion of signals phi1' and phi2' by the respective A/D converter is more precise, and the signal-to-noise ratio is greater. At the same time, because of the use of the voltage divider and the shift in signals phi1' and phi2' associated therewith, the usable signals can more easily be filtered out of those signals.

The circuit arrangement according to the present invention shown in FIG. 3 has two further advantages as compared with the circuit arrangement (FIG. 5) belonging to the existing art.

On the one hand, the circuit arrangement according to the present invention offers a diagnostic capability with which conclusions can be drawn, from the signals transmitted to the differentiating, means, as to the type of fault that may be present. For example, if both signals have the same value, this indicates a failure of the sensor due to a short circuit. In addition, interruption of one of the two signal lines 301a or 301b can be detected by means of the value of the signals transmitted to the differentiating means.

On the other hand, if an interrupted signal line (301a or 301b) is detected, it is possible on a substitution basis, with limited measurement reliability, to utilize the signal transmitted on the other, intact signal line for further processing.

A variety of sensor signals may be considered as sensor signals for which, by means of the circuit arrangement according to the present invention, elimination of the interference signals coupled onto the signal lines during transmission can be accomplished. These signals may, for example, be those generated by wheel rotation speed sensors, acceleration sensors, yaw rate sensors, steering angle sensors, pressure sensors, or temperature sensors. In addition, the circuit arrangement according to the present invention can be used with respect to any desired control units.

In addition, the circuit arrangement according to the present invention can be used not only for the elimination of interference signals coupled onto the signal lines during the transmission of sensor signals, but also, the circuit arrangement according to the invention, as shown by the second exemplifying embodiment (FIG. 4), can be used in the elimination of interference signals that are coupled onto signal lines during the transmission of any potential difference over said lines.

DETAILED DESCRIPTION

The invention will now be described first with reference to a first exemplifying embodiment, by means of FIGS. 1 to 3.

Figure 1:
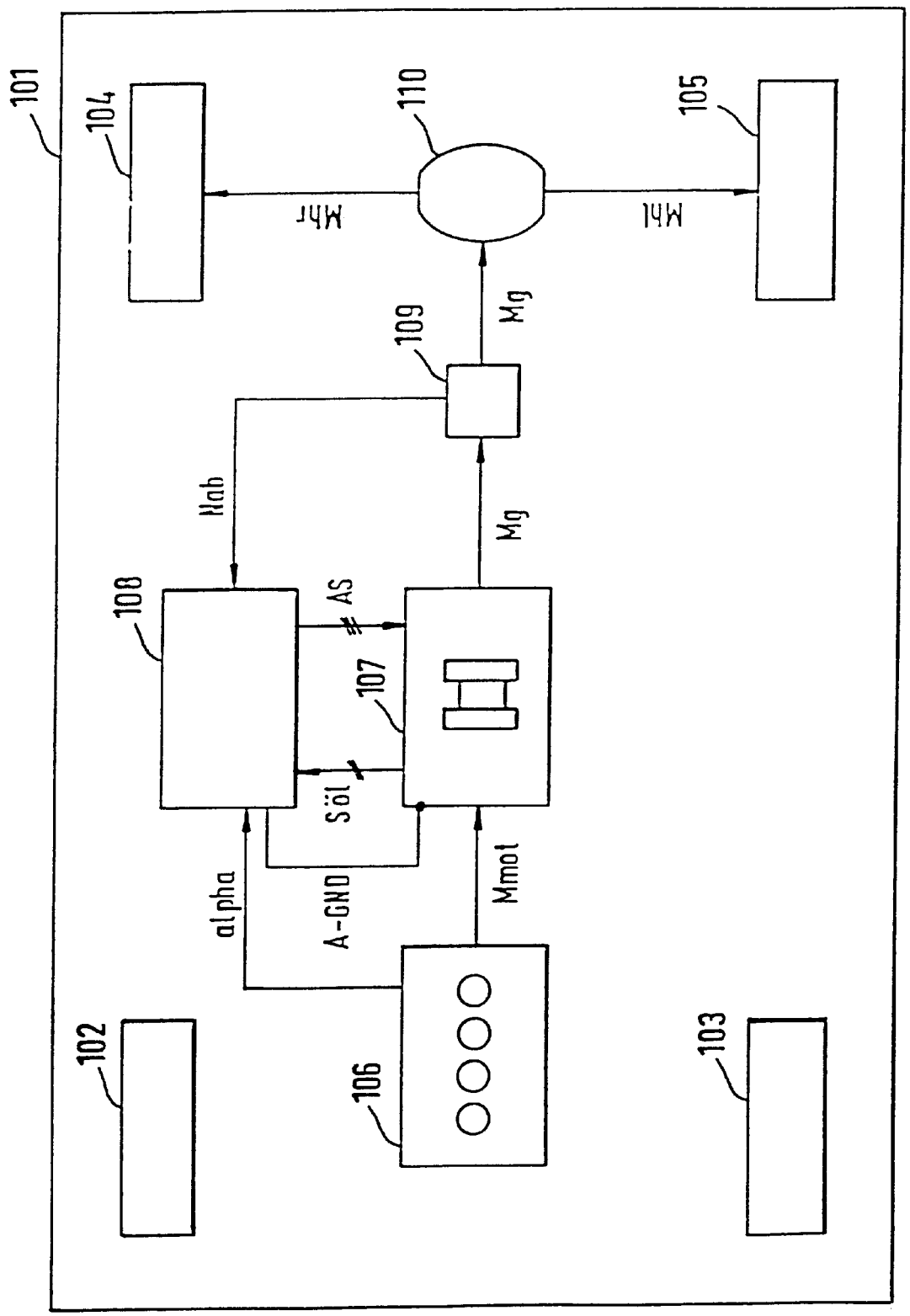
FIG. 1 illustrates a first exemplifying embodiment of the present invention.

Illustrated in FIG. 1 is a vehicle 101 which comprises front wheels 102 and 103 as well as driven rear wheels 104 and 105. Engine 106 is provided in order to drive rear wheels 104 and 105. This generates drive torque Mmot which is conveyed to transmission 107. Drive torque Mmot is converted by means of transmission 107 into torque Mg which is applied to differential 110. The two torques Mhl and Mhr, with which rear wheels 105 and 104 are driven, are made available by means of differential 110.

Since the measurement of the temperature of the oil in the transmission, in the context of the transmission control system, will be addressed as the first exemplifying embodiment on the basis of which the invention will be described, further components necessary for the transmission control system are illustrated in FIG. 1.

Accordingly, FIG. 1 illustrates a include control device 108 with which the control system for transmission 107 is implemented. Also illustrated is a mechanism 109 with which transmission output speed Nab can be sensed. This transmission output speed Nab is conveyed as an input variable to control device 108, in addition to a load-dependent variable alpha which characterizes, for example, the accelerator pedal position and/or the throttle valve angle. Also conveyed to control device 108 are signals Söl which describe the temperature of the oil in the transmission. As output signals, control device 108 outputs signals AS by means of which transmission 107 is controlled. The housing of transmission 107 is connected by means of line A-GND to ground A-GND of control device 108, thus grounding the housing of transmission 107.

Figure 2:
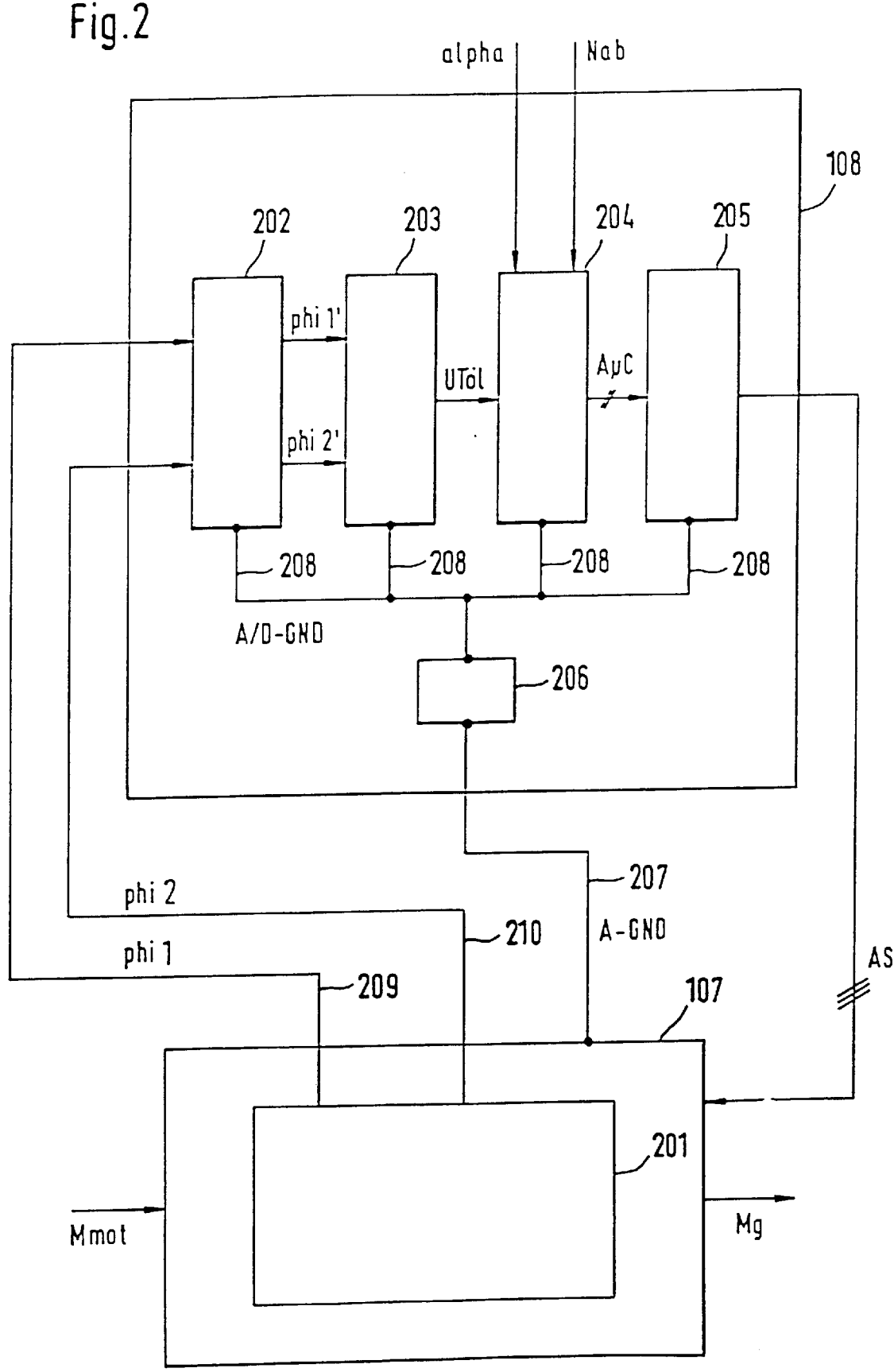
FIG. 2 illustrates the first exemplifying embodiment of the present invention in further detail.

FIG. 2 depicts in more detail exemplary components in accordance with the first exemplifying embodiment of the present invention. 107 designates the transmission, which converts torque Mmot generated by the engine into torque Mg. Transmission 107 contains a sensor means 201 for sensing the temperature of the oil in the transmission.

Control device 108 contains, for example, the following components: input circuit 202, differentiating means 203, microcontroller 204, output circuit 205, and power supply filter 206.

The housing of transmission 107 is connected via line 207 to power supply filter 206. The housing of the transmission is thus connected to ground A-GND. Components 202, 203, 204, and 205 of control device 108 are also connected, via line 208, to power supply filter 206. They are thereby connected to ground A/D-GND. The power supply filter ensures that the two grounds A-GND and A/D-GND are decoupled as completely as possible from one another.

Sensor means 201 for sensing the temperature of the oil in transmission 107 is connected via signal lines 209 and 210 to input circuit 202. Signal phi1 is transmitted by means of signal line 209, and signal phi2 by means of signal line 201, from sensor means 201 to input circuit 202.

Input circuit 202 forms output signal phi1' from input signal phi1. Similarly, it forms output signal phi2' from input signal phi2. The two signals phi1' and phi2' are input signals to differentiating means 203. On the basis of the two input signals phi1' and phi2', differentiating means 203 generates difference signal UTöl which is a direct indication of the oil temperature in transmission 107.

Differentiating means 203 can be implemented in various ways. For example, it can be implemented in the form of an analog subtracting amplifier, to which the analog input signals phi1' and phi2' are conveyed. On the basis of these two signals, the analog subtracting amplifier forms analog difference signal UTöl. This is conveyed as input signal to microcontroller 204. In order for microcontroller 204 to be able to process analog input signal UTöl, it must convert it internally into a corresponding digital signal by means of an A/D converter.

On the other hand, differentiating means 203 can also form the difference between input signals phi1' and phi2' digitally. For this purpose, both input signals phi1' and phi2' must, before processing in differentiating means 203, each be converted into digital signals by means of an A/D converter.

Using an appropriate subtraction algorithm, differentiating means 203 forms the digital output signal UTöl. This is forwarded to microcontroller 204 as the input signal. In this case, A/D conversion of the input signal in microcontroller 204 is not necessary. The A/D converters necessary for conversion prior to processing in differentiating means 203 can be either A/D converters of microcontroller 204, or discrete A/D converters.

As a function of the input signals UTöl, alpha, and Nab, microcontroller 204 generates output signals AμC. These are sent as input signals to output circuit 205.

Output circuit 205 represents essentially an amplifier circuit with which input signals AμC are converted into activation signals for controlling the transmission. Activation signals AS are used to activate actuators, located in transmission 107, with which transmission 107 is influenced.

For a further advantageous configuration of the exemplifying embodiment, it is possible, in some circumstances, to amplify signals phi1 and phi2 and/or phi1' and phi2' and/or UTöl, using additional components, before they are respectively processed in the corresponding units.

Figure 3:
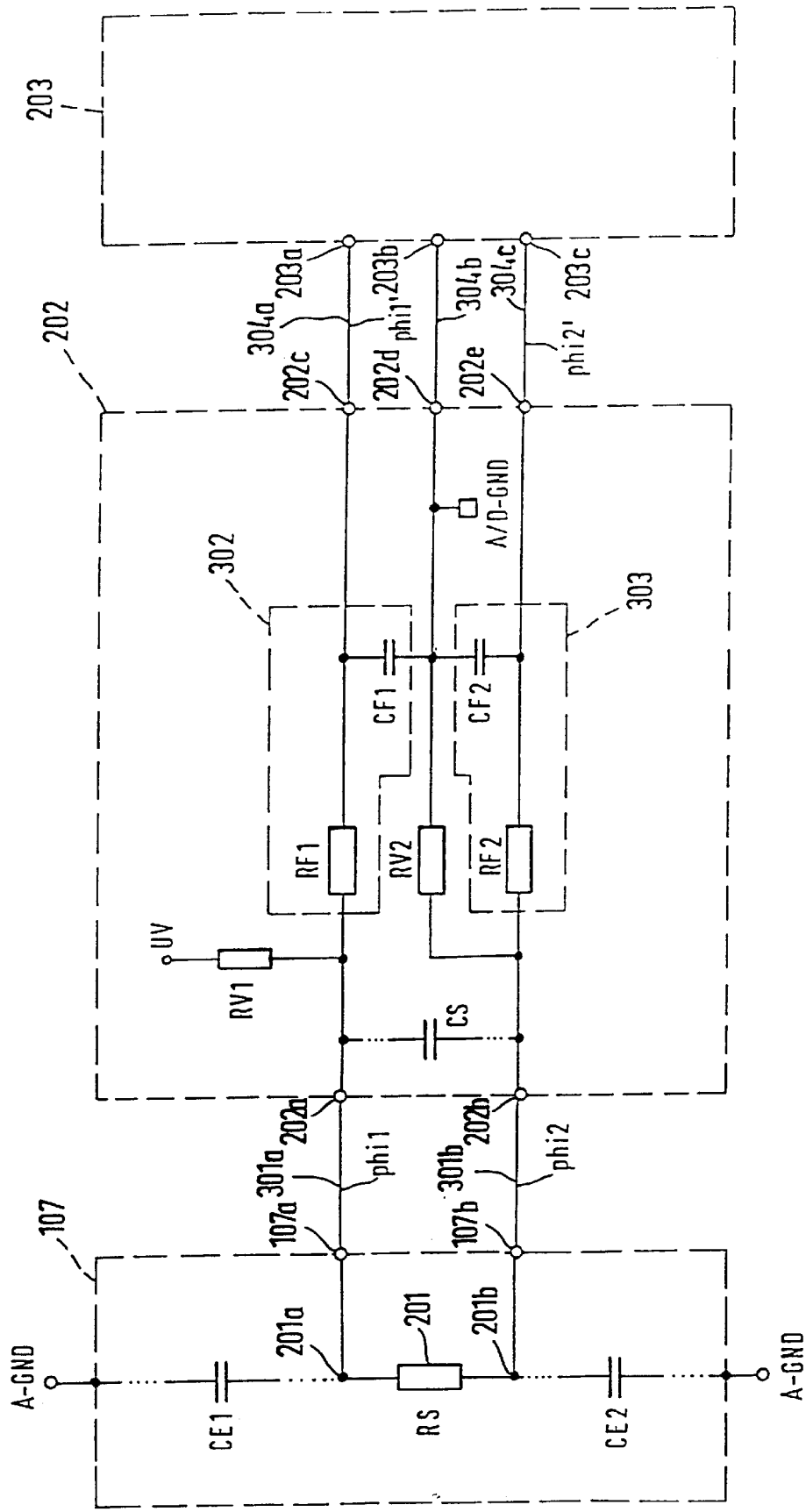
FIG. 3 depicts an exemplary circuit arrangement in accordance with the first exemplifying embodiment of the present invention.

FIG. 3 shows a circuit arrangement according to the invention which is used in the context of the transmission control system to measure the temperature of the oil in the transmission, and with which the interference signals coupled onto the signal lines are eliminated.

For this purpose, a sensor means 201 is inserted in transmission 107 in order to sense the temperature. This sensor means 201 can, for example, be a temperature-dependent resistor RS whose resistance changes as a function of the oil temperature. Terminal 201a of sensor means 201 is connected to terminal 107a attached in insulated fashion on transmission 107. Terminal 201b of sensor means 201 is correspondingly connected to terminal 107b, also attached in insulated fashion on transmission 107. The housing of transmission 107 is connected in conductive fashion to ground A-GND.

It can be particularly advantageous if terminals 201a and 201b of sensor means 201 are each connected via capacitors CE1 and CE2 to the housing of transmission 107. For this purpose, the one terminal of capacitor CE1 is connected to terminal 201a of sensor means 201. The other terminal of capacitor CE1 is connected to the housing of transmission 107. In addition, the one terminal of capacitor CE2 is connected to terminal 201b of sensor means 201, and the other terminal of capacitor CE2 to the housing of transmission 107.

Since connection of the two terminals 201a and 201b of sensor means 201, each via one of the two capacitors CE1 and CE2, to the housing of transmission 107, is not absolutely necessary in terms of converting the idea of the invention into a circuit arrangement according to the invention, the connections of the two capacitors CE1 and CE2 to sensor means 201 and to the housing of transmission 107 are indicated in FIG. 3 with dashed lines.

In addition, it can further be advantageous if the two capacitors CE1 and CE2 are housed not in transmission 107, but in control device 108, in particular in input circuit 202. The assignment of the terminals of the two capacitors CE1 and CE2 to terminals 201a and 201b of sensor means 201, and to ground A-GND, remains unchanged in this context. The connection of sensor means 201 to the two capacitors CE1 and CE2 must, however, be implemented in this case via signal lines 301a and 301b. In addition, the two capacitors CE1 and CE2 must be connected in control device 108, in particular in input circuit 202, to ground A-GND.

Terminal 107a attached on transmission 107 is connected via signal line 301a to terminal 202a of input circuit 202. Terminal 107b of transmission 107 is connected via signal line 301b to terminal 202b of input circuit 202. By means of signal line 301a, the signal phi1 generated by sensor means 201 is transmitted from sensor means 201, and thus from transmission 107, to input circuit 202. Correspondingly, by means of signal line 301b, the signal phi2 generated by sensor means 201 is transmitted to input circuit 202.

Input circuit 202 contains substantially the components RV1, RV2, CS, and the modules 302 and 303.

Component RV1 is connected at its one end to terminal 202a. Connected at the other end of component RV1 is a supply voltage UV. Component RV2 is connected at its one end to terminal 202b. The other end of component RV2 is connected to terminal 202d. At the same time, terminal 202d is connected in conductive fashion to ground A/D-GND.

Input circuit 202 contains the two modules 302 and 303, drawn with dashed lines. Module 302 is inserted between signal lines 301a and 304a and 304b. Module 303 is inserted between signal lines 301b and 304c and 304b. Since both modules 302 and 303 are not necessary for converting the idea of the invention into a circuit arrangement according to the invention, they are depicted in FIG. 3 with dashed lines.

The two modules 302 and 303 represent filters which function identically with respect to the interference signals. In the specific exemplifying embodiment, modules 302 and 303 are implemented as low-pass filters.

Module 302—the first low-pass filter—consists of a component RF1 whose one end is connected to terminal 202a. The other end of component RF1 is connected to terminal 202c. At the same time, this end of component RF1 is also connected to one end of capacitor CF1. The other end of capacitor CF1 is connected to terminal 202d.

Module 303—the second low-pass filter—consists of components RF2 and CF2. Component RF2 is connected at its one end to terminal 202b and at its other end to terminal 202e. Capacitor CF2 is connected at its one end to terminal 202e and at its other end to terminal 202d.

Components RF1 and RF2 are usually selected to be ohmic resistors. In order for the first and second low-pass filters to function identically with respect to the interference signals, the values of the two components RF1 and RF2 are selected to be identical. Similarly, in this case the two capacitors CF1 and CF2 have the same capacitance.

Terminal 202c of input circuit 202 is connected via signal line 304a to terminal 203a of differentiating means 203. Terminal 202d of input circuit 202 is connected via signal line 304b to terminal 203b of differentiating means 203. Terminal 202e of input circuit 202 is similarly connected via signal line 304c to input 203c of differentiating means 203.

By means of signal line 304a, output signal phi1' of input circuit 202 is transmitted to differentiating means 203. Output signal phi2' of input circuit 202 is transmitted via signal line 304c to differentiating means 203. Differentiating means 203 is connected to ground A/D-GND via signal line 304b.

In the exemplifying embodiment, both module 302—the first low-pass filter—and module 303—the second low-pass filter—are each implemented by means of a first-order low-pass. It is also possible to utilize higher-order low-passes. In addition to the low-pass filter shown in the exemplifying embodiment, it is of course also possible to use other filter means.

For the case in which the two modules 302 and 303 may not, because of component tolerances, be of identical design, it is possible, by feeding one and the same signal onto the two signal lines 301a and 301b, to determine by means of a correction circuit upstream from differentiating means 203 the deviation generated in this special input signal because of the different design of the two modules 302 and 303. If this deviation is known, it can be eliminated by means of the correction means, and the design differences between the two modules 302 and 303 can be compensated for.

The filters implemented by means of modules 302 and 303 are not absolutely necessary for converting the idea of the invention into a circuit arrangement according to the invention. For this reason they can, but do not need to, be taken into account in the circuit arrangement according to the invention.

The selection of components RV1 and RV2, which are impedances, is based on the type of sensor means 201. If sensor means 201 is a sensor which changes its ohmic resistance as a function of the physical magnitude being measured, then ohmic resistors are usually selected as components RV1 and RV2. If sensor means 201 is a sensor which changes its inductivity or capacitance as a function of the physical magnitude being measured, then inductors or capacitors are usually selected as components RV1 and RV2.

The physical magnitude being measured can be, for example, a temperature, a pressure, a wheel rotation speed, or an acceleration.

Instead of the individual component RV1 or individual component RV2, it is also possible to use in each case a network, consisting of multiple components, in which parallel or series circuits are implemented by the components.

In some circumstances it can be advantageous if the two components RV1 and RV2 have the same value. The voltage divider consisting of component RV1, sensor means 201, and component RV2 is thus of symmetrical construction. This may possibly be advantageous for the processing of the two signals phi1' and phi2' in differentiating means 203.

If, however, it should be advantageous in terms of an arrangement to select an asymmetrical voltage divider, this can be achieved by suitable selection of components RV1 and RV2.

Utilization of the circuit arrangement according to the invention, in the context of the transmission control system, in the measurement of the temperature of the oil in the transmission represents no limitation on the use of this circuit arrangement according to the invention. The circuit arrangement according to the invention can be used with respect to any desired sensor. For example, these can be steering angle sensors, sensors for detecting wheel speed, yaw rate sensors, acceleration sensors, or pressure sensors. The circuit arrangement according to the invention can be used both for passive and for active, e.g. current-generating, sensors.

Use of the circuit arrangement according to the invention is also not limited to use with the transmission control system. Rather it can be used with respect to any desired control devices. For example, these can be control devices for the engine control system, control devices for antilock braking systems, control devices for automatic slip control systems, or control devices for vehicle dynamics regulation.

A further advantageous embodiment of the circuit arrangement according to the invention results when capacitor CS is connected at the input of input circuit 202 at terminals 202a and 202b. This capacitor CS filters the two signals phi1 and phi2 generated by sensor means 201. Since this capacitor CS is not absolutely necessary for conversion of the underlying idea of the invention into a circuit arrangement, its connections to terminals 202a and 202b are indicated with dashed lines.

Figure 4:
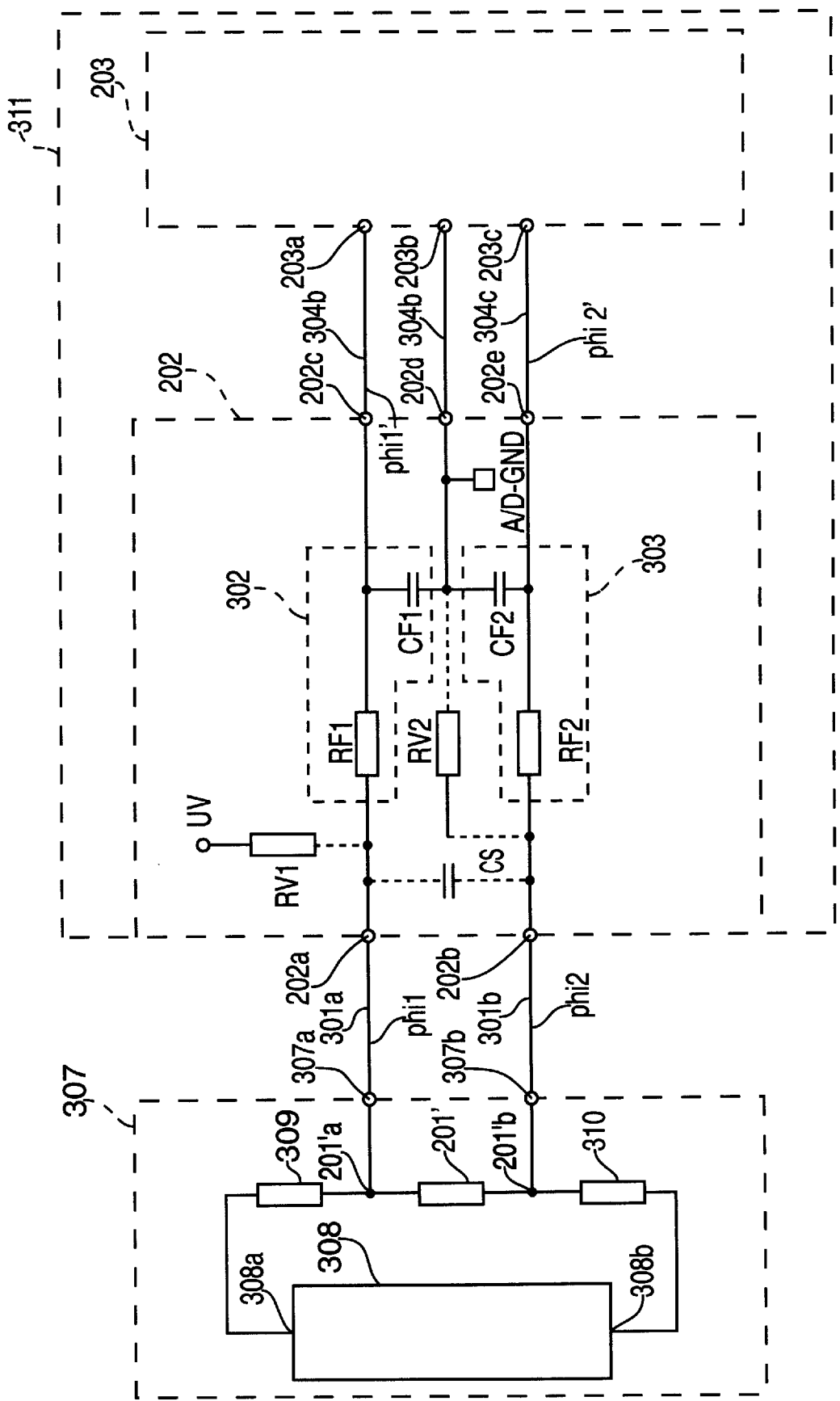
FIG. 4 depicts a second exemplifying embodiment of the present invention.
Figure 5:
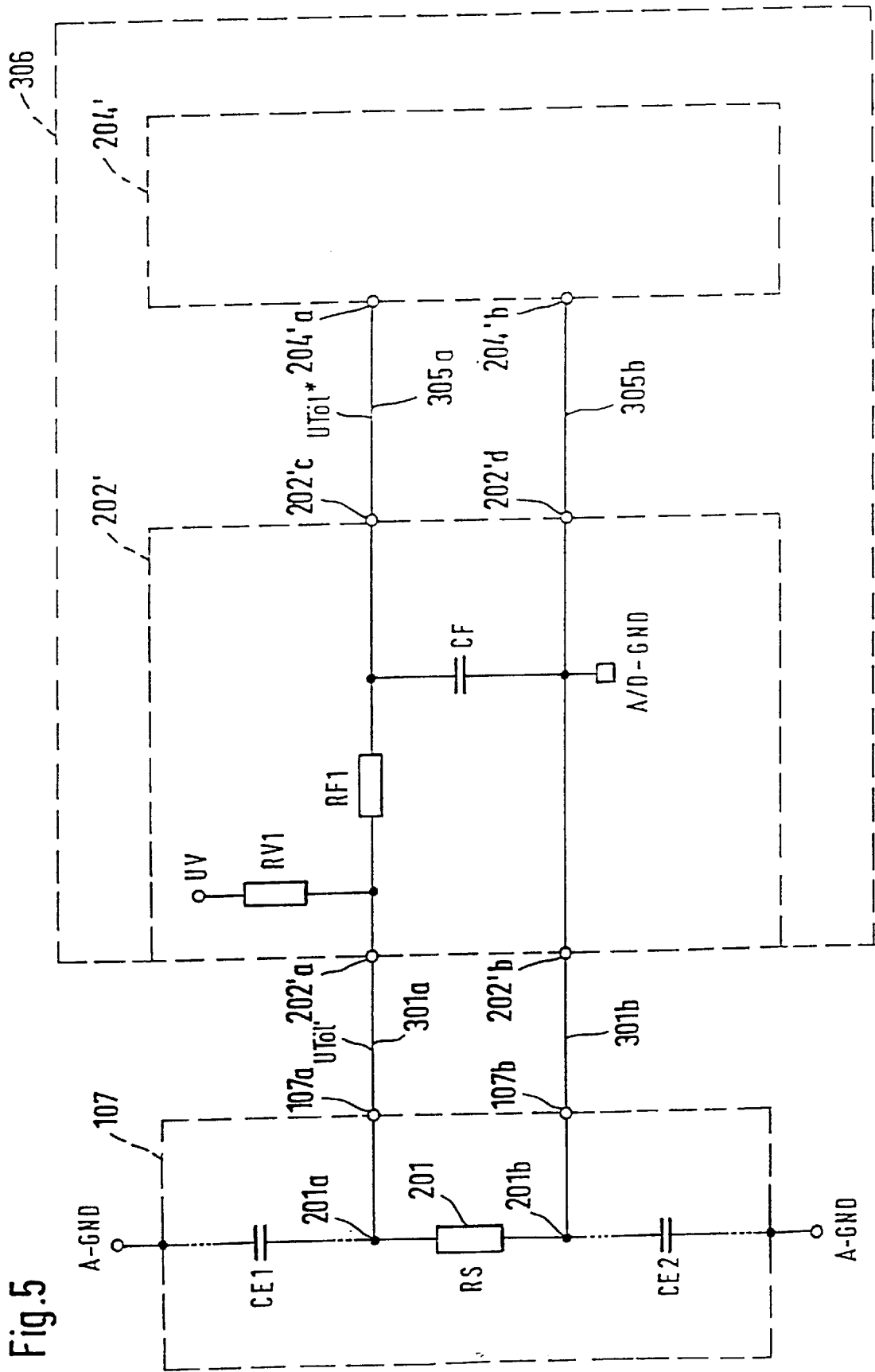
FIG. 5 illustrates a prior art circuit arrangement.

A second exemplifying embodiment will be indicated below. FIG. 4 shows a circuit arrangement according to the invention for this second exemplifying embodiment.

The circuit arrangement according to the invention in the second exemplifying embodiment is also a device that is used in a motor vehicle. With it, interference signals that are coupled onto a signal line pair during the transmission of any desired potential difference by means thereof can be eliminated. A potential difference being transmitted can be, for example, a potential difference that is proportionally related to the output voltage of an output circuit of a control device.

As FIG. 4 shows, the circuit arrangement according to the invention is intended to eliminate interference signals which, during the transmission of the potential difference between control device 307 and control device 311 using a signal line pair, are coupled onto said signal line pair. The potential difference is described by the two signals phi1 and phi2. The two signal lines 301a and 301b constitute the signal line pair.

For this purpose, the voltage divider consisting of impedances 309, 201', and 310 is connected to output circuit 308 of control device 307. The one end of impedance 309 is connected to terminal 308a of output circuit 308. The other end of impedance 309 is connected on the one hand to terminal 307a of control device 307, and on the other hand to terminal 201'a of impedance 201'. Terminal 201'b of impedance 201' is simultaneously connected to terminal 307b of control device 307 and to the one end of impedance 310. The other end of impedance 310 is connected to terminal 308b of output circuit 308.

Signal line 301a connects terminal 307a of control device 307 to terminal 202a of input circuit 202 of control device 311. By means of control line 301b, output 307b of control device 307 is connected to terminal 202b of input circuit 202 of control device 311.

Processing of the two signals phi1 and phi2 in input circuit 202 corresponds to the description given in the first exemplifying embodiment.

Since the potential difference to be transmitted by means of the signal line pair in the second exemplifying embodiment is not one generated by a sensor, components RV1 and RV2, and the supply voltage, can be dispensed with in input circuit 202. They can, however, also be retained if an advantageous configuration in the second exemplifying embodiment should result therefrom. This is indicated in FIG. 4 by the dashed lines at the terminals of components RV1 and RV2.

Since output circuit 308 of control device 307 generates an output voltage at its terminals 308a and 308b, these terminals are referred to as voltage terminals. The potential difference described by signals phi1 and phi2 is proportional to the output voltage generated by output circuit 308 of control device 307.

In the case of the circuit arrangement according to the invention shown in FIG. 4, it may certainly also be advantageous for impedance 201' arranged between signal lines 301a and 301b also to be arranged in control device 311 rather than in control device 307.

In general, it can be assumed that the invention concerns a device in a motor vehicle for transmitting a potential difference via at least one signal line pair. The potential difference can, in this context, occur at a sensor or at an impedance. The sensor or impedance is in each case part of a voltage divider between supply voltage terminals or voltage terminals. A signal line is connected at each terminal of the impedance or of the sensor. The other end of the signal lines is guided to a differentiating means.

What is claimed is:

1. A device in a motor vehicle for transmitting a potential difference over at least one signal line pair and with which interference signals coupled onto the at least one signal line pair during a transmission of the potential difference are eliminated, comprising:

a voltage divider, the voltage divider having a first end and a second end and including at least a first impedance having a first terminal and a second terminal, a second impedance coupled to the first terminal and a third impedance coupled to the second terminal, the first end of the voltage divider coupled to a first voltage terminal of an output circuit, and the second end of the voltage divider coupled to a second voltage terminal of the output circuit, the first impedance having the potential difference;

a differentiator; and at least one signal line pair, the at least one signal line pair including a first signal line and a second signal line, each of the first signal line and the second signal line having a first end and a second end, the first end of the first signal line being coupled to the first terminal, the second end of the first signal line being coupled to the differentiator, the first end of the second signal line being coupled to the second terminal, and the second end of the second signal line being coupled to the differentiator, wherein, according to the potential difference, the first signal line has a first potential and the second signal line has a second potential, and wherein the differentiator forms a difference between the first potential and the second potential.

2. The device according to claim 1, further comprising:
a first filter coupled to the first signal line, the first filter filtering interference signals on the first signal line, and
a second filter coupled to the second signal line, the second filter filtering interference signals on the second signal line, the second filter functioning identically to the first filter.

3. The device according to claim 2, wherein each of the first filter and the second filter includes a low-pass filter.

4. The device according to claim 1, wherein the differentiator includes an analog subtractor.

5. The device according to claim 1, further comprising:
a digitizer, coupled to the differentiator, the first signal line, and the second signal line, the digitizer digitizing signals on the first signal line and second signal line and providing the digitized signals to the differentiator.

6. A device in a motor vehicle for transmitting signals and with which interference signals coupled onto signal lines during a transmission of the signals are eliminated, the signals being generated by a sensor, the signals representing a physical magnitude, the sensor constituting a voltage divider and including a first terminal and a second terminal, comprising:

a voltage divider including the sensor, a first impedance, and a second impedance, the sensor coupled to the first impedance at the first terminal, and the sensor coupled to the second impedance at the second terminal, the voltage divider having a first end and a second end, the first end of the voltage divider coupled to a first voltage terminal, and the second end of the voltage divider coupled to a second voltage terminal;

a differentiator;

a first signal line having a first end and a second end, the first end of the first signal line coupled to the first terminal of the sensor, and the second end of the first signal line coupled to the differentiator; and a second signal line having a first end and a second end, the first end of the second signal line coupled to the second terminal of the sensor, and the second end of the second signal line coupled to the differentiator, wherein the differentiator forms a difference between a signal on the first signal line and a signal on the second signal line.

7. The device according to claim 6, further comprising:
a first filter coupled to the first signal line, the first filter filtering interference signals on the first signal line, and
a second filter coupled to the second signal line, the second filter filtering interference signals on the second signal line, the second filter functioning identically to the first filter.

8. The device according to claim 7, wherein each of the first filter and the second filter includes a low-pass filter.

9. The device according to claim 6, wherein the voltage divider has a symmetrical configuration, and wherein the first impedance and the second impedance have identical impedance values.

10. The device according to claim 6, wherein the differentiator includes an analog subtractor.

11. The device according to claim 6, further comprising:
a digitizer, coupled to the differentiator, the first signal line, and the second signal line, the digitizer digitizing signals on the first signal line and second signal line and providing the digitized signals to the differentiator.

12. The device according to claim 6, wherein the sensor has an ohmic resistance, the ohmic resistance changing as a function of the physical magnitude.

13. The device according to claim 6, wherein the sensor has at least one of a capacitative value and an inductive value, the at least one of the capacitative value and the inductive value changing as a function of the physical magnitude.

14. The device according to claim 6, wherein the physical magnitude is an oil temperature in a transmission control system.

15. The device according to claim 1, further comprising:
a housing;
a first capacitor; and
a second capacitor, wherein:
the voltage divider includes a sensor having a first terminal coupled to the first terminal of the voltage divider and a second terminal coupled to the second terminal of the voltage divider,
the first capacitor includes a first terminal coupled to the first terminal of the sensor and a second terminal coupled to the housing, and
the second capacitor includes a first terminal coupled to the second terminal of the sensor and a second terminal coupled to the housing.

16. The device according to claim 6, further comprising:
a housing;
a first capacitor; and
a second capacitor, wherein:
the first capacitor includes a first terminal coupled to the first terminal of the sensor and a second terminal coupled to the housing, and
the second capacitor includes a first terminal coupled to the second terminal of the sensor and a second terminal coupled to the housing.

* * * * *